US012667961B2

(12) United States Patent　　　　　(10) Patent No.:　US 12,667,961 B2
Sansfaçon et al.　　　　　　　　　　　(45) Date of Patent:　　Jun. 30, 2026

(54) ROBOTIC GRIPPER

(71) Applicant: ROBOTIQ INC., Lévis (CA)

(72) Inventors: Renaud Sansfaçon, Québec (CA);
Pierre-Luc Belzile, Levis (CA);
Louis-Alexis Allen Demers, Levis
(CA); Yan Drolet Mihelic, Québec
(CA); Pascal Lapointe, Québec (CA);
Jean-Philippe Jobin, Lévis (CA);
Bianca Lachance, Beaumont (CA)

( * ) Notice: Subject to any disclaimer, the term of this
patent is extended or adjusted under 35
U.S.C. 154(b) by 41 days.

(21) Appl. No.: 18/818,820

(22) Filed: Aug. 29, 2024

(65) Prior Publication Data

US 2024/0416513 A1　　Dec. 19, 2024

Related U.S. Application Data

(62) Division of application No. 17/054,198, filed as
application No. PCT/CA2019/050641 on May 13,
2019, now Pat. No. 12,103,180.

(Continued)

(51) Int. Cl.
G06F 17/00　　　　(2019.01)
B25J 9/16　　　　　(2006.01)
(Continued)

(52) U.S. Cl.
CPC ........... B25J 9/1612 (2013.01); B25J 13/088
(2013.01); B25J 15/026 (2013.01);
(Continued)

(58) Field of Classification Search
CPC ...... B25J 9/1612; B25J 13/088; B25J 15/026;
B25J 19/0004; F16H 19/04; F16H 37/04;
(Continued)

(56) References Cited

U.S. PATENT DOCUMENTS

| | | | |
|---|---|---|---|
| 4,605,354 A | 8/1986 | Daly | |
| 4,765,668 A | 8/1988 | Slocum et al. | |

(Continued)

FOREIGN PATENT DOCUMENTS

| CN | 102773865 B | 11/2015 |
|---|---|---|
| CN | 105835056 A | 8/2016 |

(Continued)

OTHER PUBLICATIONS

Male, female, connector, gripper, input, output, arm, robot, tendon,
mounting, connector, snap, cable, signal, chamber, housing, enclo-
sure, signal port (Year: 2017).*

(Continued)

*Primary Examiner* — Ronnie M Mancho
(74) *Attorney, Agent, or Firm* — Anglehart et al.

(57)　　　　　　ABSTRACT

In one aspect, the present disclosure provides a robot gripper
with a closing mechanism that while providing a desirable
closing speed avoids exerting a force on the rigid object
which is greater than the holding force required to hold the
rigid object in the gripper. In another aspect, the present
invention provides a robot gripper capable of detecting a slip
or loss of an object held by the gripper. In an alternative
aspect, the present invention provides a robot gripper
capable of being hand guided. In another aspect, the inven-
tion provides a robot gripper brake drive circuit with faster
operation. In one other aspect, the invention provides a
connector for connecting a robot end effector to a robot arm
with an adjustable cable.

17 Claims, 10 Drawing Sheets

Related U.S. Application Data

(60) Provisional application No. 62/670,823, filed on May 13, 2018.

(51) Int. Cl.

| | |
|---|---|
| *B25J 13/08* | (2006.01) |
| *B25J 15/02* | (2006.01) |
| *B25J 19/00* | (2006.01) |
| *F16H 19/04* | (2006.01) |
| *F16H 37/04* | (2006.01) |
| *H02K 7/102* | (2006.01) |
| *H02K 7/116* | (2006.01) |
| *H02K 11/215* | (2016.01) |
| *H02K 11/33* | (2016.01) |
| *H02K 21/24* | (2006.01) |
| *H02P 6/16* | (2016.01) |
| *H02P 6/24* | (2006.01) |
| *F16H 1/28* | (2006.01) |

(52) U.S. Cl.

CPC .......... *B25J 19/0004* (2013.01); *F16H 19/04* (2013.01); *F16H 37/04* (2013.01); *H02K 7/102* (2013.01); *H02K 7/116* (2013.01); *H02K 11/215* (2016.01); *H02K 11/33* (2016.01); *H02K 21/24* (2013.01); *H02P 6/16* (2013.01); *H02P 6/24* (2013.01); *F16H 1/28* (2013.01); *F16H 2702/02* (2013.01); *H02P 2207/05* (2013.01)

(58) Field of Classification Search

CPC ....... F16H 1/28; F16H 2702/02; H02K 7/102; H02K 7/116; H02K 11/215; H02K 11/33; H02K 21/24; H02P 6/16; H02P 6/24; H02P 2207/05

USPC ........................................................ 700/250

See application file for complete search history.

(56) References Cited

U.S. PATENT DOCUMENTS

| | | | |
|---|---|---|---|
| 4,789,292 A | | 12/1988 | Holcomb |
| 6,669,257 B2 * | | 12/2003 | Laliberte .............. B25J 15/0009 192/48.91 |
| 6,817,641 B1 * | | 11/2004 | Singleton, Jr. ........... B25J 9/102 901/29 |
| 7,331,094 B2 * | | 2/2008 | Berninger ............... B23P 21/00 29/559 |
| D677,294 S | | 3/2013 | Long |
| 8,525,460 B2 | | 9/2013 | Reiland et al. |
| 8,534,729 B2 | | 9/2013 | Wilkinson et al. |
| 8,585,111 B2 * | | 11/2013 | Nammoto ................ B25J 15/10 901/38 |
| 8,618,762 B2 | | 12/2013 | Reiland et al. |
| 8,973,958 B2 | | 3/2015 | Allen Demers et al. |
| D740,371 S | | 10/2015 | Ries |
| 9,381,648 B1 * | | 7/2016 | Liu ...................... B25J 15/0266 |
| D782,553 S | | 3/2017 | Goto et al. |
| D783,695 S | | 4/2017 | Ke et al. |
| D785,688 S | | 5/2017 | Matsuda |
| 9,696,221 B2 | | 7/2017 | Lauzier et al. |
| 9,839,534 B2 | | 12/2017 | Lipsey et al. |
| 9,850,108 B2 | | 12/2017 | Gao et al. |
| D809,041 S | | 1/2018 | Zhang et al. |
| 10,016,893 B2 | | 7/2018 | Nagai |
| 10,034,780 B2 | | 7/2018 | Lipsey et al. |
| D827,005 S | | 8/2018 | Huang et al. |
| D827,006 S | | 8/2018 | Lin et al. |
| D833,497 S | | 11/2018 | Strain et al. |
| D839,332 S | | 1/2019 | Bailey et al. |
| 10,260,970 B2 | | 4/2019 | Lauzier et al. |
| 10,369,016 B2 | | 8/2019 | Lipsey et al. |
| D865,827 S | | 11/2019 | Zhang et al. |
| D883,351 S | | 5/2020 | Sansfaçon et al. |
| 10,682,774 B2 | | 6/2020 | Bingham et al. |
| 10,875,187 B2 | | 12/2020 | Paquin et al. |
| 11,464,654 B2 | | 10/2022 | Lipsey et al. |
| 11,573,140 B2 | | 2/2023 | Lauzier et al. |
| 12,103,180 B2 | | 10/2024 | Sansfaçon et al. |
| 2008/0181757 A1 | | 7/2008 | Wheeler et al. |
| 2010/0170368 A1 | | 7/2010 | Hu |
| 2011/0048650 A1 | | 3/2011 | Lawson et al. |
| 2011/0067517 A1 | | 3/2011 | Ihrke et al. |
| 2011/0190934 A1 | | 8/2011 | Reiland et al. |
| 2011/0232411 A1 | | 9/2011 | Long |
| 2011/0265597 A1 | | 11/2011 | Long |
| 2011/0290059 A1 | | 12/2011 | Pan |
| 2011/0290060 A1 | | 12/2011 | Long |
| 2012/0085191 A1 | | 4/2012 | Long |
| 2012/0290133 A1 | | 11/2012 | Goto et al. |
| 2013/0047771 A1 | | 2/2013 | Liu et al. |
| 2013/0131695 A1 | | 5/2013 | Scarfogliero et al. |
| 2014/0116182 A1 | | 5/2014 | Long |
| 2014/0125080 A1 | | 5/2014 | Dan et al. |
| 2014/0137687 A1 | | 5/2014 | Nogami et al. |
| 2014/0156066 A1 | | 6/2014 | Sakano |
| 2014/0265401 A1 | | 9/2014 | Allen Demers et al. |
| 2014/0338490 A1 | | 11/2014 | Shinabe |
| 2014/0366673 A1 | | 12/2014 | Yamazaki et al. |
| 2015/0027261 A1 | | 1/2015 | Okahisa et al. |
| 2015/0343647 A1 * | | 12/2015 | Garcia ................. B25J 15/0085 294/200 |
| 2016/0221188 A1 | | 8/2016 | Nagai |
| 2016/0250536 A1 | | 9/2016 | Hart |
| 2016/0263749 A1 | | 9/2016 | Ogata |
| 2016/0331482 A1 | | 11/2016 | Hares |
| 2017/0173800 A1 | | 6/2017 | Genefke |
| 2017/0225341 A1 | | 8/2017 | Kerestes et al. |
| 2017/0254709 A1 | | 9/2017 | Lauzier et al. |
| 2017/0312917 A1 | | 11/2017 | Chung et al. |
| 2018/0222056 A1 | | 8/2018 | Suzuki et al. |
| 2019/0195702 A1 | | 6/2019 | Lauzier et al. |
| 2019/0270207 A1 | | 9/2019 | Motowaki |
| 2021/0213607 A1 | | 7/2021 | Sansfaçon et al. |
| 2024/0416512 A1 | | 12/2024 | Sansfaçon et al. |
| 2024/0416513 A1 | | 12/2024 | Sansfaçon et al. |

FOREIGN PATENT DOCUMENTS

| | | | | |
|---|---|---|---|---|
| CN | 104339366 B | * | 7/2017 | .......... B25J 19/0025 |
| CN | 108942917 A | | 12/2018 | |
| CN | 108290284 B | * | 7/2019 | ............. B25J 15/10 |
| DE | 102012001386 B4 | | 4/2021 | |
| EP | 1424174 A1 | | 6/2004 | |
| EP | 2829369 A2 | * | 1/2015 | .......... B25J 19/0025 |
| EP | 3053711 A1 | | 8/2016 | |
| JP | H0740266 A | * | 2/1995 | |
| JP | 2002079487 A | * | 3/2002 | |
| JP | 2008149444 A | | 7/2008 | |
| JP | 7331246 B2 | * | 8/2023 | ............. B25J 19/00 |
| KR | 101790946 B1 | | 10/2017 | |
| SE | 522933 C2 | * | 3/2004 | .......... B25J 19/0029 |
| WO | 2014/110682 A1 | | 7/2014 | |
| WO | 2017/052350 A2 | | 3/2017 | |
| WO | 2019/218057 A1 | | 11/2019 | |

OTHER PUBLICATIONS

RG6 Gripper Datasheet (Year: 2017).*

International application No. PCT/CA2019/050641 Written Opinion of the International Searching Authority dated Sep. 4, 2019.

International application No. PCT/CA2019/050641 Search Strategy dated Sep. 4, 2019.

International application No. PCT/CA2019/050641 Corrected version of Written Opinion of the International Searching Authority (replaced) dated Feb. 12, 2020.

International application No. PCT/CA2019/050641 Corrected version of International Search Report dated Feb. 12, 2020.

(56) References Cited

OTHER PUBLICATIONS

Filipe Veiga et al., Grip Stabilization through Independent Finger Tactile Feedback Control. Sensors. 2020, 20, 1748; doi: 10.3390/s20061748.

Corresponding U.S. Appl. No. 18/818,795 Office Action dated Dec. 11, 2025.

Bhatia, A., et al., Direct Drive Hands: Force-Motion Transparency in Gripper Design (Year: 2019). In Robotics: Science and Systems, Messe Freiburg, Germany, Jun. 2019.

* cited by examiner

Motor size/power impractical

Motor Power

Backdrivable limit

Small motor size/efficient power 1        1000

Gear Ratio

Motor power as a function of gear ratio for nominal holding force

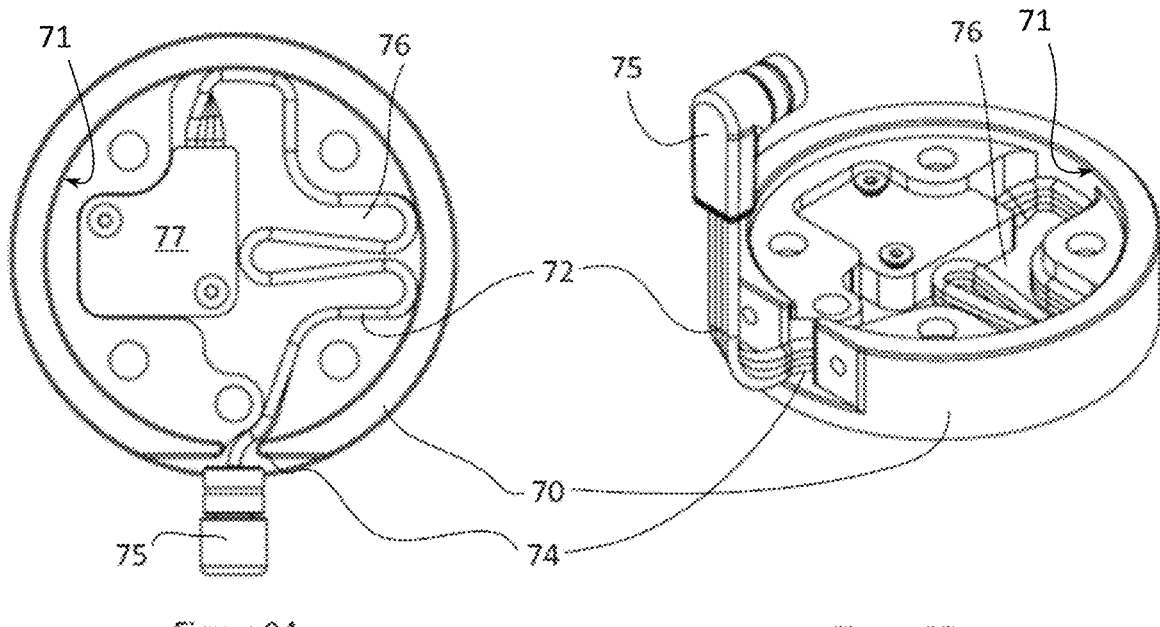
Figure 9A                    Figure 9B
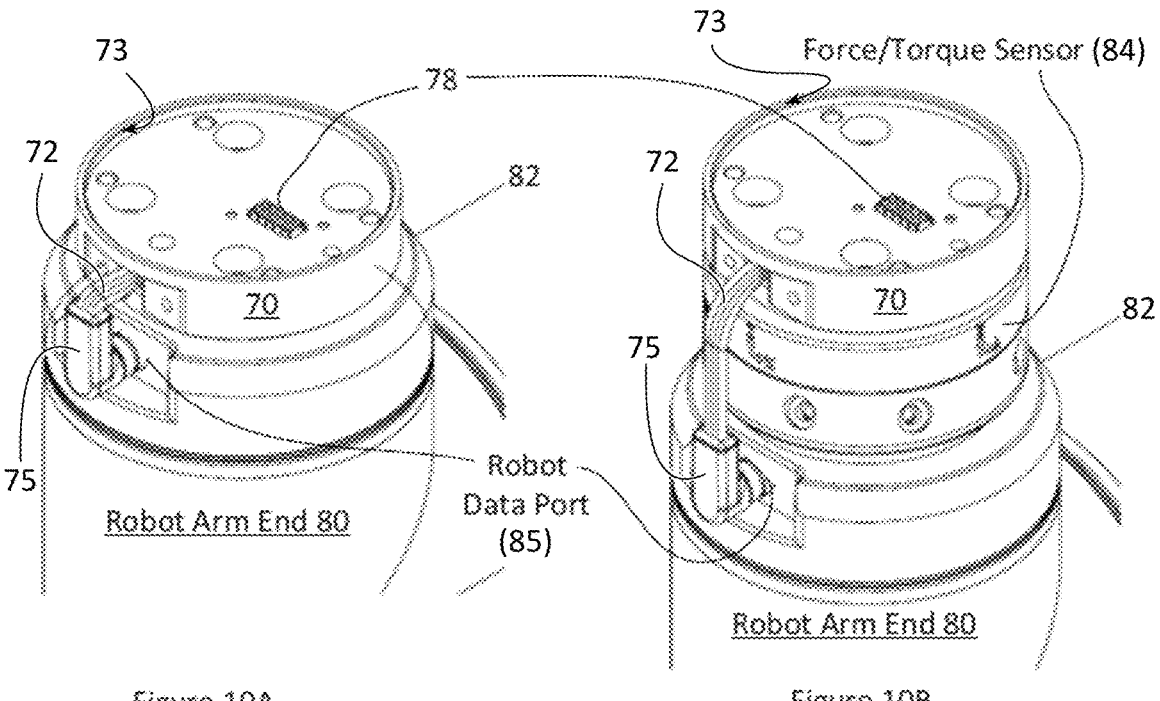
Figure 10A                    Figure 10B

ROBOTIC GRIPPER

CROSS-REFERENCE TO RELATED APPLICATIONS

The present patent application a divisional patent application of U.S. patent application Ser. No. 17/154,198 filed Nov. 10, 2020, now allowed, that is a national stage in the U.S. of PCT/CA2019/050641 filed May 13, 2019, that claims priority of U.S. provisional patent application Ser. No. 62/670,823 filed 13 May 2018, the contents of which are hereby incorporated by reference.

TECHNICAL FIELD

The present relates to the field of robotics end effectors and more specifically to the field of robotic grippers, as well as robotic end effector couplers.

BACKGROUND

A mechatronic manipulator is a mechanical device controlled electronically to move or orient an end-effector such as a gripper in space. The term manipulator in this document will refer to mechatronic manipulator having one or more degree-of-freedom (DOF). One category of mechatronic manipulator is a robot manipulator as defined by International Standard ISO 8373 being an "automatically controlled, reprogrammable multipurpose manipulator programmable in three or more axes".

While it is desired for robotic grippers to be able to close their fingers at a higher speed, this would result in high inertia and excessive pinch force which sometimes could damage or break a frigid option that the gripper wants to hold. Hence, there exists a need for a robotic gripper with a motor and gear combination that while closes at a higher speed does not have a peak force much higher than the desired pinch force.

The early detection of slipping by a robotic gripper can contribute to controlling the contact forces to prevent slipping and to successfully manipulate an uncertain object. Hence, there exists a need for a simple system that could detect an object slipping from a robotic gripper to prevent losing it. The present disclosure has come up with a method and mechanism for detecting slippage and/or loss of an object.

The braking mechanisms are essential in robotic grippers because they allow the gripper to hold the object without having the motor engaged at full capacity at all time preventing overheating of the motor. An issue with the braking mechanisms is that they have a fall or decay with before they get engaged. The present disclosure has a solution to reduce this fall time.

Learning a robotic gripper how to work is a time-consuming task, especially when the user has to hold the robotic gripper with one hand and work with an input panel, a teach pendant, with the other hand. The present invention provides a solution to this problem removing the need to use a pendant to give commands to the robotic gripper using a backdrivable gear mechanism.

A common problem in the robotics industry is with data cables and the fact that despite long durability of other parts the manipulator the data cables can get damaged pretty easily causing an interruption in the performance of the robot. This could be the result of the environmental hazards or the cable getting in the way or damaged by the manipulator itself. The present invention provides a data connectivity at the manipulator end without excessive cabling.

SUMMARY

The present disclosure provides, inter alia, novel and innovative solutions for the above-mentioned problems.

In one aspect, the present disclosure provides a robot gripper with a closing mechanism that while providing a desirable closing speed avoids exerting a force on the rigid object which is greater than the holding force required to hold the rigid object in the gripper. The gripper comprises a DC motor; a reduction gear mechanism having an input connected to the DC motor and an output; a gripper finger drive mechanism connected to the output of the reduction gear mechanism; at least one finger connected to the gripper finger drive mechanism; and a motor drive controller configured to provide a voltage to the DC motor to rotate at a nominal maximum speed and exert a nominal maximum torque when arrested wherein a pinch force of the at least one finger, generated when the at least one finger is arrested by contacting a rigid object and causing the DC motor to decelerate from a speed close to the nominal maximum down to zero, is less than 60% greater than a holding force of the at least one finger due to the motor exerting the nominal maximum torque.

In another aspect the present invention discloses a robot gripper comprising a DC motor, a reduction gear mechanism having an input connected to said DC motor and an output, a gripper finger drive mechanism connected to the output of the reduction gear mechanism, at least one finger connected to said gripper finger drive mechanism. The gripper finger drive mechanism comprises one pinion drive gear and two racks which are driven by the pinion drive gear. It also comprises a pair of opposed fingers each extending to one side and upwardly from a corresponding one of two racks for performing an opposed parallel pinch grasp. Each of the driven racks has a cross-like cross-section and is seated in a linear track or bearing at one end of the robot gripper.

The cross shaped cross-sectional design of the driven racks provides the necessary support for forces imposed on the fingers. It will be appreciated by those skilled in the art that the cross-section shape does not need to exactly be shaped like a cross and can be formed by any shaped similarly providing support as understood by the person skilled in the art, namely the rack should be seated in a precision linear bearing while resisting forces or torques caused by the forces acting on the fingers.

Furthermore, in an alternative aspect, the present invention provides a robot gripper capable of being hand guided. The robot gripper comprises a DC motor; a reduction gear mechanism having an output and an input connected to the DC motor; a gripper finger drive mechanism connected to the output of the reduction gear mechanism; one or more fingers connected to the gripper finger drive mechanism; and a motor drive controller configured to provide a voltage to the DC motor; an encoder reading a position of one of the motor and the gripper drive mechanism; and a hand guiding action interpreter connected to the encoder, the hand guiding action interpreter configured to respond to the position read by the due to operator action on the at least one finger and to interpret the motion to output a signal representing at least one operator command.

In some embodiments, the gripper finger drive mechanism of the robot gripper may include one or more pinion drive gears and driven racks. In one embodiment, one pinion drives two racks at the same time.

In one embodiment, the gripper has two racks driven by one pinion drive gear. It may further include a pair of opposed fingers. Each of the fingers may extend to one side and upwardly from a corresponding rack for performing an opposed parallel pinch grasp.

In some embodiments, one or more driven racks may have a cross-like cross-section. The racks may be seated in a linear track or bearing at one end of said robot gripper.

In some embodiments, the robot gripper includes a palm plate extending under the pair of opposed fingers. It will be appreciated that a "palm" plate may cover the pinion gear and/or bear a sensor for detecting when an object makes contact with the palm plate.

In some embodiments, the reduction gear mechanism includes a planetary gear arrangement as known in the art.

In one example, an upper portion of the gripper is longer in the direction in which the two racks move (motion direction) than the width of the upper portion.

In one embodiment, the pinch force created by one or more fingers, which is generated when the one or more fingers is arrested by contacting a rigid object causing the DC motor to decelerate from a speed close to the nominal maximum down to zero, is less than 10% greater than the holding force of the at least one finger due to said motor exerting the nominal maximum torque.

In some embodiments, the robot gripper may also include an encoder reading a position of one of the motor and the gripper drive mechanism, an electrically controllable brake, a play coupling connected between the DC motor and the brake, wherein said play coupling allows said DC motor to rotate within limits when said brake is applied, and an object slip or loss detector connected to said encoder and configured to signal when the DC motor rotates within the limits when said brake is applied due to object slip or loss under conditions of a bias applied to the DC motor.

In one example, the object slip or loss detector includes a processor associated with program memory storing processor instructions which when executed perform measuring a position of said motor with said motor off and said brake applied, applying a low voltage to said motor, the low voltage exerting enough force to move said motor within said limits when no object is seized by said at least one finger and not enough force to move said motor within said limits when an object is seized by said at least one finger; and determining from said position from said encoder whether an object is seized by said gripper.

Alternatively, the robot gripper with object slip or loss detector may include a processor associated with program memory storing processor instructions which when executed measures a position of the motor with the motor off and said brake applied, applies a variable voltage to said motor which exerts enough force to move said motor within said limits when an object is seized by the at least one finger, measures a position of said motor, records the variable voltage at which said motor moves within said limits; repeats the applying and the recording steps and determines from the variable voltage at which the motor moves within said limits to determine a change in the gripping force exerted on the object seized by the gripper, said change being indicative of the object slip.

In an example, the processor instructions further perform reducing a voltage applied to the motor for a period of time after the recording before re-applying said variable voltage.

In some embodiments, the play coupling comprises a biasing member for biasing said DC motor against a first one of the limits when no object is seized. It will be appreciated by those skilled in the art that the biasing member may work in combination with any of above-mentioned mechanism biasing the motor or alternatively be the only mechanism for biasing the motor.

In some embodiments, the hand gripper may further comprise an encoder reading a position of one of the motor and the gripper drive mechanism; and a hand guiding action interpreter connected to the encoder, the hand guiding action interpreter configured to respond to the position read by the due to operator action on the at least one finger and to interpret the motion to output a signal representing at least one operator command.

In some embodiments, the gripper further comprises an electrically controllable brake having a coil for controlling a braking force; and a brake drive circuit having a brake control input and a coil signal output variable between at least an ON state and an OFF state, wherein said brake drive circuit comprises a switch responsive to an overvoltage caused by switching from said ON state to the OFF state to drain a voltage on the coil.

In will be appreciated by those skilled in the art that while these features are explained in form of separate embodiments they can be combined and implemented together. For example, an encoder reading the position of the motor can also be used to read the movement of the biased motor when the break is engaged as well as for the hand guiding action mechanism and other purposes as disclosed herein and there is no need to have redundancy of elements. Likewise, one integral controller can be used for hand guiding action interpretation. Furthermore, the processor associated with program memory storing processor may be integrated in the controller.

In one broad aspect, the present disclosure provides a method of manufacturing products including using any of the devices and robot grippers disclosed herein for manufacturing products. In different examples, the method may include use of different embodiments, variants and examples of the robot gripper as disclosed herein. In some examples, the method comprises use of more than one embodiment and/or variant and its related features for manufacturing a product.

In another aspect, the present invention provides a robot gripper capable of detecting a slip or loss of an object held by the gripper. The gripper comprises a DC motor; a backdrivable reduction gear mechanism having an input connected to the DC motor and an output; a gripper finger drive mechanism connected to the output of the reduction gear mechanism; at least one finger connected to the gripper finger drive mechanism; and a motor drive controller configured to provide a voltage to the DC motor; an encoder reading a position of one of the motor and the gripper drive mechanism; an electrically controllable brake; a play coupling connected between the DC motor and the brake, wherein the play coupling allows the DC motor to rotate within limits when the brake is applied; an object slip or loss detector connected to the encoder and configured to signal when the DC motor rotates within the limits when the brake is applied due to object slip or loss under conditions of a bias applied to the DC motor.

In one other aspect, the present invention discloses a method of detecting a slip or loss of an object from a robot gripper. The method comprises holding an object by at least on finger of the robot gripper having a motor and gripper drive mechanism with elasticity; applying a brake of said robot gripper to seize said object; detecting a movement of the drive mechanism caused by said elasticity upon the slip of loss of said object.

In one example, the detecting a movement of the drive mechanism caused by said elasticity upon the slip of loss of said object of the method comprises measuring a position of a motor of the robot gripper with said motor off and said brake applied; applying a low voltage to said motor, said low voltage exerting enough force to move said motor within limits of a play coupling connected between the motor and the gripper drive mechanism and the brake when no object is seized by said at least one finger and not enough force to move said motor within said limits when an object is seized by said at least one finger; and determining from said position from said encoder whether an object is seized by said gripper.

In another example, the detecting a movement of the drive mechanism caused by said elasticity upon the slip of loss of said object of the method comprises measuring a position of said motor with said motor off and said brake applied; applying a variable voltage to said motor, said variable voltage exerting enough force to move said motor within said limits when an object is seized by said at least one finger; measuring a position of said motor; recording said variable voltage at which said motor moves within said limits; repeating said applying and said recording; determining from said variable voltage at which said motor moves within said limits to determine a change in said gripping force exerted on said object seized by said gripper, said change being indicative of said object slip.

In one broad aspect example, the present disclosure provides a method of manufacturing products which includes using the method of detecting a slip or loss of an object held by a gripper in accordance to any of the method examples and embodiments disclosed herein, including the combination of more than one example of the method disclosed herein.

In another aspect, the present disclosure provides a method of teaching a robot gripper. The method comprising: applying a motion on at least one finger of said robot gripper by an operator; using an encoder to read changes of a position of a motor and a gripper drive mechanism of the robot gripper caused by said motion; interpreting said changes of at least one finger to output a signal representing at least one operator command by a hand guiding action interpreter connected to said encoder.

In one broad aspect, the present disclosure provides a method of manufacturing a product wherein the method comprises using the method of teaching a robot gripper disclosed herein to manufacture a product. In an example, the operator can use different commands defined for the robot gripper as disclosed herein to teach the gripper how to take different steps required for manufacturing, preparing or assembling a product and use them to process the product accordingly. This would be advantageous as would make the teaching process more efficient.

In another aspect, the present application provides a robot gripper comprising a DC motor, a backdrivable reduction gear mechanism having an input connected to the DC motor and an output, a gripper finger drive mechanism connected to said output of said reduction gear mechanism, at least one finger connected to said gripper finger drive mechanism, and a motor drive controller configured to provide a voltage to said DC motor, an encoder reading a position of one of said motor and said gripper drive mechanism, an electrically controllable brake, a play coupling connected between said DC motor and said brake, wherein said play coupling allows said DC motor to rotate within limits when said brake is applied, an object slip or loss detector connected to said encoder and configured to signal when said DC motor rotates within said limits when said brake is applied due to object slip or loss under conditions of a bias applied to said DC motor.

In some embodiments, the object slip or loss detector comprises a processor associated with program memory storing processor instructions which when executed performs measuring a position of said motor with said motor off and said brake applied, applying a low voltage to said motor, said low voltage exerting enough force to move said motor within said limits when no object is seized by said at least one finger and not enough force to move said motor within said limits when an object is seized by said at least one finger; and determining from said position from said encoder whether an object is seized by said gripper.

In some embodiments, the object slip or loss detector comprises a processor associated with program memory storing processor instructions which when executed performs measuring a position of said motor with said motor off and said brake applied, applying a variable voltage to said motor, said variable voltage exerting enough force to move said motor within said limits when an object is seized by said at least one finger, measuring a position of said motor, recording said variable voltage at which said motor moves within said limits, repeating said applying and said recording, determining from said variable voltage at which said motor moves within said limits to determine a change in said gripping force exerted on said object seized by said gripper, said change being indicative of said object slip.

In one example, the processor instructions further perform reducing a voltage applied to said motor for a period of time after said recording before re-applying said variable voltage.

In some embodiments, the play coupling comprises a biasing member for biasing said DC motor against a first one of said limits when no object is seized.

In another aspect, the invention provides a robot gripper brake drive circuit responsive to an overvoltage. The robot gripper comprises of a DC motor; a reduction gear mechanism having an input connected to the DC motor and an output; a gripper finger drive mechanism connected to the output of the reduction gear mechanism; at least one finger connected to the gripper finger drive mechanism; and a motor drive controller configured to provide a voltage to the DC motor; an electrically controllable brake having a coil for controlling a braking force; a brake drive circuit having a brake control input and a coil signal output variable between at least an ON state and an OFF state, wherein the brake drive circuit comprises a switch responsive to an overvoltage caused by switching from the ON state to the OFF state to drain a voltage on the coil.

In another aspect, a robot gripper has been disclosed comprising a DC motor, a reduction gear mechanism having an input connected to the DC motor and an output, a gripper finger drive mechanism connected to said output of said reduction gear mechanism, at least one finger connected to said gripper finger drive mechanism; and a motor drive controller configured to provide a voltage to said DC motor, an encoder reading a position of one of said motor and said gripper drive mechanism; and a hand guiding action interpreter connected to said encoder, said hand guiding action interpreter configured to respond to said position read by said due to operator action on said at least one finger and to interpret said motion to output a signal representing at least one operator command.

In some embodiments, the hand guiding action interpreter is connected to said motor drive controller and causes said motor drive controller to apply a low voltage to said to counter a cogging torque of said reduction gear mechanism without moving said at least one finger.

In some embodiments, the motor drive controller is configured to cause said at least one finger to move by a predetermined amount in a direction corresponding to a direction of said operator action in response to said signal representing at least one operator command.

In some embodiments, the motor drive controller is configured to cause said at least one finger to move in a direction opposite to a direction of said operator action in response to said signal representing at least one operator command, wherein said operator action comprises a sequence of actions.

In some embodiments, the motor drive controller is configured to cause said at least one finger to move to a fully open position in response to said signal representing at least one operator command, wherein said operator action comprises a sequence of at least two closing actions.

In some embodiments, the robot gripper may include an electrically controllable brake; and a play coupling connected between said DC motor and said brake, wherein said play coupling allows said DC motor to rotate within limits when said brake is applied, wherein said hand guiding action interpreter is connected to said motor drive controller and causes said motor drive controller to move said motor to discover clockwise and counter clockwise motor positions of said limits, to move said motor to a middle of said limits and to detect operator action from movement of said motor towards said limits.

In some embodiments, the robot gripper also includes a force-torque sensor associated with a mounting of said robot gripper for mounting said robot gripper to a robot manipulator end, wherein said force-torque sensor measures operator forces applied to said robot gripper.

In one broad aspect, a robot gripper has been disclosed. The gripper comprises a DC motor, a reduction gear mechanism having an input connected to said DC motor and an output, a gripper finger drive mechanism connected to said output of said reduction gear mechanism, at least one finger connected to said gripper finger drive mechanism; a motor drive controller configured to provide a voltage to said DC motor, an electrically controllable brake having a coil for controlling a braking force, a brake drive circuit having a brake control input and a coil signal output variable between at least an ON state and an OFF state, wherein said brake drive circuit comprises a switch responsive to an overvoltage caused by switching from said ON state to the OFF state to drain a voltage on said coil.

In one other aspect, the invention provides a connector for connecting a robot end effector to a robot arm having a signal port, the connector comprising of a mounting securable to the robot arm; a mounting securable to the end effector; a signal cable having a length with a first end and a second end; a chamber for receiving the signal cable, the chamber having an opening for paying out the second end of signal cable; an end effector data connector connected to the first end and having an end effector signal connector associated with the mounting compatible with the end effector; and a robot data connector connected to the second end for connecting to the signal port.

In some embodiments of the connector, the robot data connector is an L-shaped 90-degree connector.

In some embodiments of the connector, the signal cable is a ribbon cable.

In some embodiments of the connector, the opening of said chamber frictionally engages said signal cable to provide tension on said signal cable.

It will be appreciated by those killed in the art that although these features have been explained to be in different embodiments, examples and variants, a combination of these feature may be used without exceeding the scope of the present invention.

In one other aspect, a method of producing, manufacturing, composing, assembling, and packaging of a product has been disclosed in which a robotic gripper as disclosed herein and/or any of its features is used to achieve the final product.

Likewise, in another aspect a method of manufacturing a product using the connector in accordance with the present disclosure has been provided.

BRIEF DESCRIPTION OF THE DRAWINGS

The invention will be better understood by way of the following detailed description of embodiments of the invention with reference to the appended drawings, in which:

FIG. 9A illustrates a top view of a connector for connecting a robot end effector to a robot arm having a signal cable secured inside a chamber in accordance with one aspect of the present invention.

FIG. 9B illustrates a perspective view of the connector in FIG. 9A wherein the signal cable is outside of its chamber.

FIG. 10A illustrates a perspective view of the connector in FIG. 9A connected directly on a robotic arm end.

FIG. 10B illustrates a perspective view of the connector in FIG. 9A connected to a robotic arm end by a force/torque sensor.

DETAILED DESCRIPTION

Figures 1A, 1B:
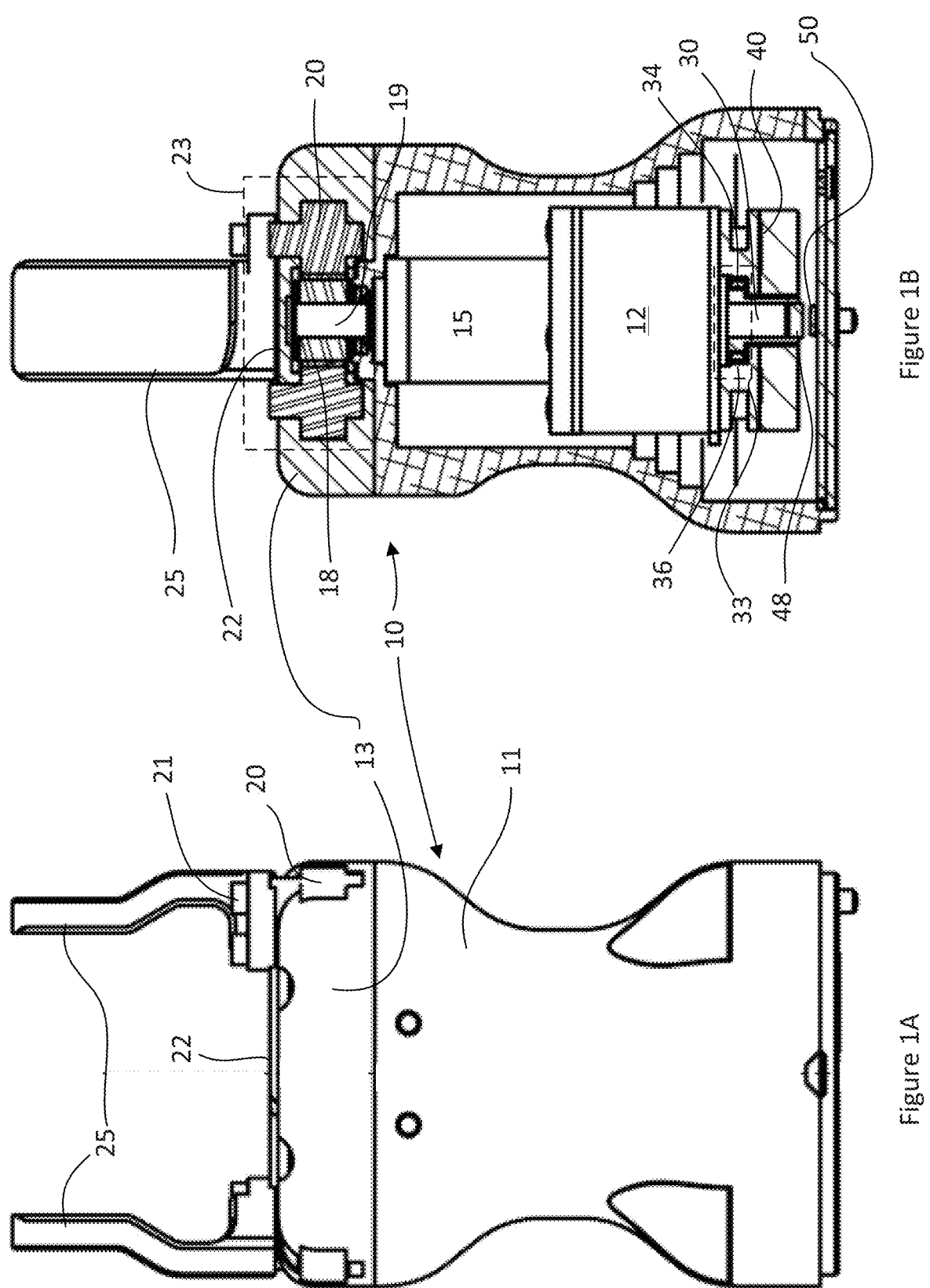
FIG. 1A illustrates a front elevational view of a robotic gripper in accordance to one embodiment of the present invention.
FIG. 1B is a cross-sectional side view of a robotic gripper in FIG. 1A.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. Reference will now be made in detail to the preferred embodiments of the invention.

In one aspect, the present disclosure provides a robot gripper with a closing mechanism that while providing a desirable closing speed avoids exerting a force on the rigid object which is greater than the holding force required to hold the rigid object in the gripper. The gripper comprises a DC motor; a reduction gear mechanism having an input connected to the DC motor and an output connected to a gripper finger drive mechanism by a shaft; one or more fingers connected to the gripper finger drive mechanism; and a motor drive controller configured to provide a voltage to the DC motor to rotate at a nominal maximum speed and exert a nominal maximum torque when arrested wherein pinch force of between the fingers, generated when the at least one finger is arrested by contacting a rigid object and causing the DC motor to decelerate from a speed close to the nominal maximum down to zero, is less than 60% greater than a holding force of the at least one finger due to the motor exerting the nominal maximum torque.

In another aspect, the present invention provides a robot gripper capable of detecting a slip or loss of an object held by the gripper. The gripper comprises a DC motor; a back drivable reduction gear mechanism having an input connected to the DC motor and an output; a gripper finger drive mechanism connected to the output of the reduction gear mechanism; at least one finger connected to the gripper finger drive mechanism; and a motor drive controller configured to provide a voltage to the DC motor; an encoder reading a position of one of the motor and the gripper drive mechanism; an electrically controllable brake; a play coupling connected between the DC motor and the brake, wherein the play coupling allows the DC motor to rotate within limits when the brake is applied; an object slip or loss detector connected to the encoder and configured to signal when the DC motor rotates within the limits when the brake is applied due to object slip or loss under conditions of a bias applied to the DC motor.

Furthermore, in a different aspect, the present invention provides a robot gripper capable of being hand guided in a learning mode. The robot gripper comprises of a DC motor; a reduction gear mechanism having an input connected to the DC motor and an output; a gripper finger drive mechanism connected to the output of the reduction gear mechanism; at least one finger connected to the gripper finger drive mechanism; and a motor drive controller configured to provide a voltage to the DC motor; an encoder reading a position of one of the motor and the gripper drive mechanism; and a hand guiding action interpreter connected to the encoder, the hand guiding action interpreter configured to respond to the position read by the due to operator action on the at least one finger and to interpret the motion to output a signal representing at least one operator command.

In another aspect, the invention provides a robot gripper brake drive circuit responsive to an overvoltage. The robot gripper comprises a DC motor; a reduction gear mechanism having an input connected to the DC motor and an output; a gripper finger drive mechanism connected to the output of the reduction gear mechanism; at least one finger connected to the gripper finger drive mechanism; and a motor drive controller configured to provide a voltage to the DC motor; an electrically controllable brake having a coil for controlling a braking force; a brake drive circuit having a brake control input and a coil signal output variable between at least an ON state and an OFF state, wherein the brake drive circuit comprises a switch responsive to an overvoltage caused by switching from the ON state to the OFF state to drain a voltage on the coil.

In one other aspect, the invention provides a connector for connecting a robot end effector to a robot arm having a signal port, the connector comprising a mounting securable to the robot arm; a mounting securable to the end effector; a signal cable having a length with a first end and a second end; a chamber for receiving the signal cable, the chamber having an opening for paying out the second end of signal cable; an end effector data connector connected to the first end and having an end effector signal connector associated with the mounting compatible with the end effector; and a robot data connector connected to the second end for connecting to the signal port.

Referring to FIG. 1A, an elevation front view of an embodiment of a robotic gripper 10 is shown wherein each of fingers 25 is secured to a gripper finger drive mechanism 23 shown in FIG. 1B using a pair of fasteners 21.

As illustrated in FIG. 1B, the gripper finger drive mechanism 23 is connected by a shaft 19 to an output of a reduction gear mechanism 15. A DC motor 12 is connected at one end to an input of the reduction gear mechanism 15 and at another end to a shaft 30 which is connected to an electrically controllable brake (herein after "brake") 40. The brake 40 and the shaft 30 connect to each other by a play coupling mechanism 33 (dashed line box) which provides the gripper finger 10 with an object slip/loss detection ability.

Figures 1C, 1D, 2:
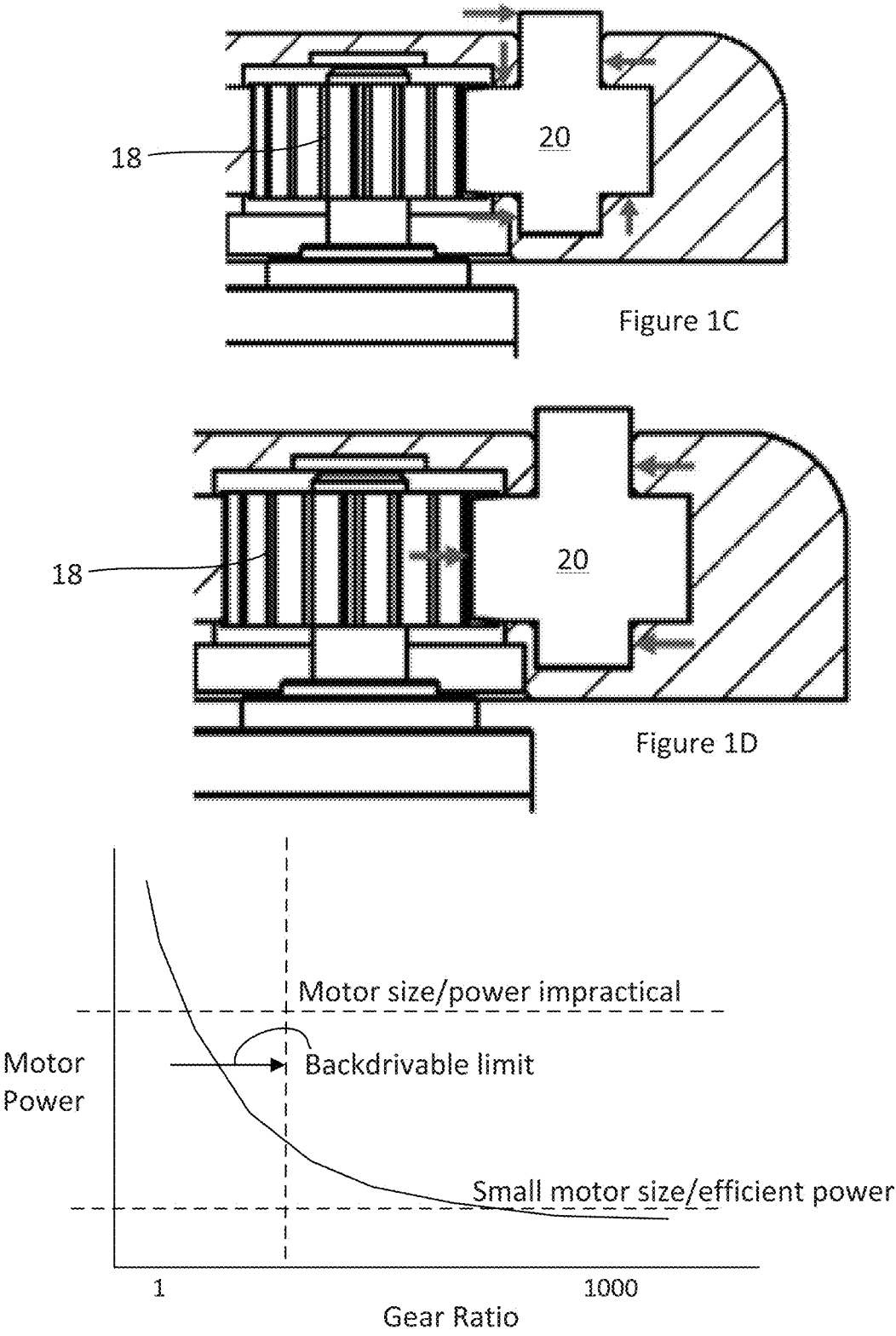
FIG. 1C illustrates a partial cross-sectional side view of the robotic gripper showing the force and torque interaction between a gripper finger drive and a cross sectional shaped slide.
FIG. 1D illustrates a partial cross-sectional side view of the robotic gripper showing the force and torque interaction between a gear mechanism and the cross-sectional shaped slide.
FIG. 2 is a diagram showing motor power required as a function of gear ratio for nominal holding force.

FIG. 1C illustrates an example of the gripper finger drive mechanism 23 using a rack and pinion mechanism. Other finger drive mechanisms are known in the art. The finger 25 can be secured to a rack 20 shaped as a cross by the fasteners 21 receiving the DC motor's output from the shaft 19 via a pinion 18. Alternatively, the fingers 25 can be integral with the racks 20, for example by machining them from a single block or by casting or molding, for example molded from nylon or PEEK or die cast from a suitable metal. It will be appreciated that a "palm" plate 22 can be provided that covers the pinion gear 18. Such a palm plate 22 can bear a sensor for detecting when an object makes contact with the palm plate 22. Such a molded finger and rack combination can be the same part used for each side due to symmetry. The racks 20 can include an end of the geared surface that prevents the pinion 18 from ejecting the racks 20, with changing of the racks 20 requiring removal of the palm plate 22.

The fingers 25 illustrated in FIGS. 1A and 1B have an upper contact surface and a curved lower portion that allows to better grip a round object held against the palm 22 and can also allow for flexion of the finger 25 without the finger contact surface deflecting at an outward angle as much as a flat, orthogonal mounted finger. It will also be appreciated that an upper portion 13 of the gripper 10 is longer in a direction of motion of the two racks 20 (see FIG. 1A) than it is wider (see FIG. 1B). This configuration can make it easier to approach the upper portion 13 near a flat surface to pick up an object thereon using fingers 25 with the motor axis 30 almost parallel with the flat surface.

As illustrated in FIGS. 1C and ID, the cross shape of the rack 20 allows it to better transfer the force and torque it receives from the fingers 25 and the pinion 18 to a housing 13.

It will be appreciated by those skilled in the art that brake mechanism 40 and the play coupling 33 can be placed anywhere in the system to stop the movement of the fingers 25 but in some preferred embodiments, the brake mechanism 40 and the play coupling 33 is located before the input section of the reduction gear mechanism 15 so that it can detect any movement of the fingers 25 easier benefitting from the gear ratio of the reduction gear mechanism 15. The gear ratio would multiply the movement of the fingers 25, hence, increasing the movement of the shaft 30 which makes it easier to detect. The gearing 15 can be a suitable planetary gear arrangement, as is known in the art.

The DC motor 12 can be any kind of DC motor known in the art such as Permanent Magnet DC Motors, Series DC Motors, Shunt DC Motors, and Compound DC Motors and can have different types of output shaft settings. In some embodiments, the DC motor is a brushless design in which the motor rotational position is sensed and a motor controller circuit responds to the motor position to control current in the motor windings. In some embodiments, the DC motor 12 only has one output shaft, and the brake mechanism 40 and the play coupling 33 are placed between the DC motor and the reduction gear mechanism 15. The reduction gear mechanism 15 can be backdrivable, meaning that force applied to the fingers 25 near the holding force can cause the motor 15 (when not powered) to turn. This has certain functional advantages as will be described in detail below, such as providing a user with the option of physically manipulating the gripper fingers. Normally, of two systems using the same type of gearing, the one with the smaller gear ratio is usually more backdrivable.

FIG. 2 shows the motor power required as a function of gear ratio for the nominal holding force. As illustrated, the motor power required decrease with the increase of the gear ratio. FIG. 2 is a schematic illustration with arbitrary units for the purposes of illustrating that the motor size versus gear ratio function is non-linear, it is normally desirable for an optimal or efficient gripper in terms of size and power consumption to use a small motor with a large gear ratio, it is impractical to have a direct drive DC motor due to the motor size or power, and there is a gear ratio limit for a backdriveable gearing. It will be understood that whether a gearing is backdriveable or not can also depend on the gear design's tribological properties.

Figures 3, 4A, 4B, 4C, 4D:
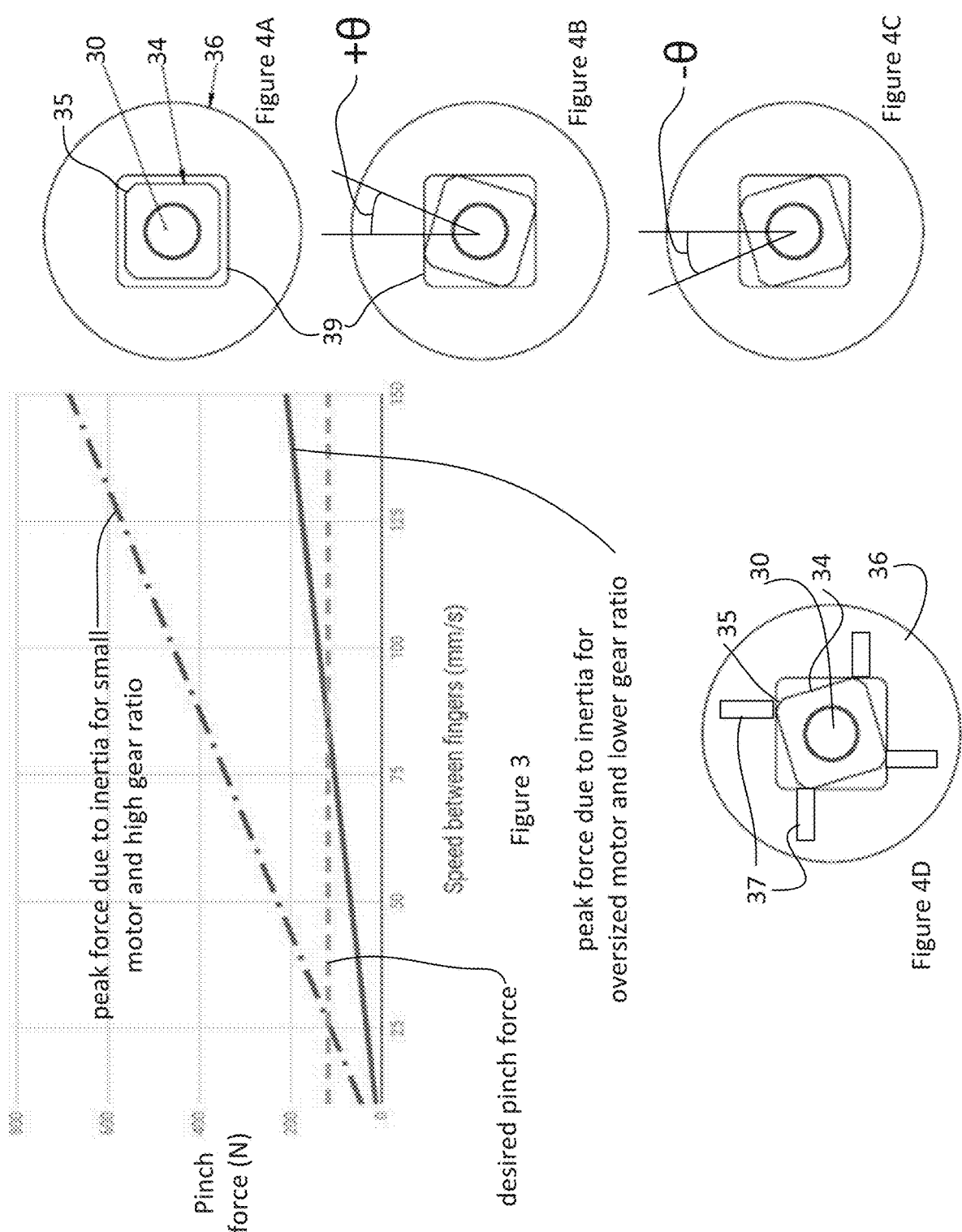
FIG. 3 is a diagram showing a peak force due to inertia for an oversized motor and lower gear ratio vs a small motor and high gear ratio as a function of speed between fingers of the gripper.
FIG. 4A illustrates a top view of an object slip or loss detector mechanism of the present invention in accordance with one embodiment of the present invention.
FIG. 4B illustrates a top view of the object slip or loss detector mechanism in FIG. 4A wherein a controllable brake and a shaft connected to a DC motor of the robotic of the robotic gripper rotate together.
FIG. 4C illustrates a top view of the object slip or loss detector mechanism in FIG. 4A wherein the robotic gripper has lost an object.
FIG. 4D illustrates a top view of an object slip or loss detector mechanism of the present invention in accordance with an alternative embodiment of the present invention in which a biasing member is included.

FIG. 3 illustrates a peak force due to inertia for an oversized motor and lower gear ratio (solid line) vs a small motor and high gear ratio (dash-dot line) for a desired pinch force (dash line) as a function of speed between fingers of the gripper. As shown, the peak force for a small motor and high gear ratio is much higher than the desired pinch force which could result in damaging the object that is being held/picked by the gripper fingers. This is due to the high rotational inertia of the fast-spinning motor. On the other hand, the oversized motor and lower gear ratio would provide a much lower peak force due to inertia which is much closer to the desired pinch force. The diagram in FIG. 3 shows that with an increase of the speed between two fingers, the peak force due to inertia increases for both gear and motor size combinations but the slope of increase is much higher for the small motor with a high gear ratio combination making this combination only appropriate, depending on the desired pinch force, at a very low range of speed. For the given desired pinch in the table, this speed would be around 25 mm/s while for the oversized motor and lower gear ratio a speed between 75 and 100 mm/s can be used without largely exceeding the desired pinch force. In some embodiments, the peak force is less than 60% greater than the desired pinch force, while in others the peak force is less than 20% greater than the desired pinch force, and still in others the peak force is less than 10% greater than the desired pinch force.

In some embodiments, as illustrated in FIG. 4A, the play coupling mechanism 33 has two portions. A shaft portion 34 which is secured to and rotates with the shaft 30 and a brake portion 36. The shaft portion is placed inside an opening 39 of the brake portion 36 which is connected to the brake mechanism 40. The shaft portion 34 may have a rounded or chamfered corners 35 which, as illustrated in FIG. 4B, allows the shaft portion 36 to slightly play and rotate for θ degree inside the opening 39 before engaging with the inner walls of the brake portion 36 rotating it.

When shaft 30 starts rotating, the shaft portion 34 rotates +θ degree relative to the brake portion 36 before engaging the inner walls of the brake portion 36 and start rotating it. When the fingers 25 reach an object, an object detector 60 applies the brake 40 and then turns off the DC motor 12 to hold the object between the fingers 25. Upon shutting the DC motor off, the shaft 30 and the shaft portion 34 rotate 2θ degrees in the opposite direction to a −θ position until it engages to the walls of the inner wall of the opening 39 as illustrated in FIG. 4C.

In one embodiment, an object slip/loss detector may apply a minimal voltage to the motor 12 providing a low motor bias force. Upon losing the object from the fingers 25, this low bias force causes the shaft portion 34 to rotate back to position +θ degree relative to the brake portion 36. This rotation can be detected by a motor encoder 50 indicating the slip/loss of the object held by the fingers 25.

As shown in FIG. 4D, in an alternative embodiment of the present discloser, instead of applying a minimal voltage to the motor 12, bias members 37 provide the bias force required to rotate the shaft portion 34 to +θ degree inside the opening 39. The bias members 37 shown can be small coil springs, however, any resilient member whether acting torsionally at the shaft 34 or between 36 and 39 will provide the bias required to rotate the shaft 34 when the object is lost.

In some embodiments, the brake portion 36 of the play coupling mechanism 33 is not a separate part and is formed by creating the opening 39 inside a cover plate 48 of the brake 40.

It will be appreciated by those skilled in the art that any mechanism allowing a rotation of the shaft 30 upon losing the object from the fingers 25 can be used instead of the play coupling mechanism 33 used in this embodiment. For example, a non-linear torsion spring element can be used.

Figures 5, 6:
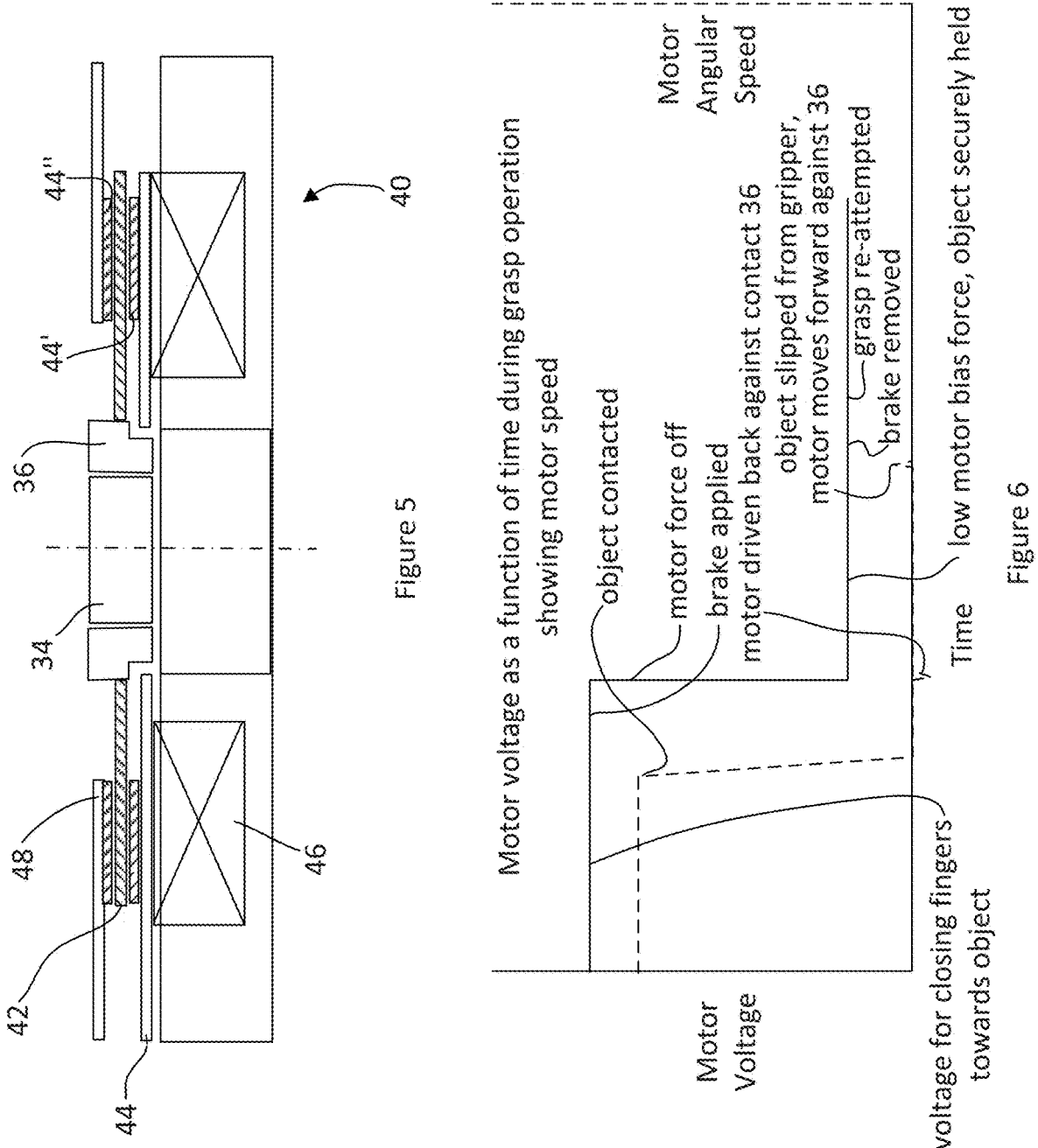
FIG. 5 illustrates a cross-sectional side view of a brake in accordance to an embodiment of the present invention.
FIG. 6 is a diagram showing a DC motor's voltage as a function of time during grasp operation showing motor speed.

An example of an electrically controllable brake, a power-off brake-applied type brake is shown schematically in FIG. 5. Power off brakes stop or hold a load when electrical power is either accidentally lost or intentionally disconnected. They are also known as "fail-safe" brakes. These brakes are typically used on or near an electric motor.

When no current/voltage is applied to the brake 40, a series of springs or other biasing members (not shown) push against a pressure plate 44, squeezing a friction disk 42 between the inner pressure plate or pad 44' and the outer cover plate or pad 44". This frictional clamping force is transferred to a shaft element 36, which is mounted to the shaft 30.

The brake 40 is considered engaged when no power is applied to it. It is typically required to hold the object when the voltage to the DC motor 12 is cut off. When the brake 40 is required to release, voltage/current is applied to the coil 46 creating a magnetic field. This magnetic field pulls in the pressure plate 44 pulling against the springs, creating an air gap between the pressure plate 44 and the friction disk 42, allowing it to turn freely with the shaft. Further details could be found at Ogura industrial electromagnetic power off brake's general description.

It will be appreciated by those skilled in the art that other types of brake mechanism alternatives are contemplated as being within the scope of the invention.

FIG. 6 illustrates the input voltage received (shown by solid lines) and the angular speed (shown by dash lines) of the DC motor 12 during a grasp operation. As illustrated, while the fingers 25 are closing towards the object, the input voltage is higher resulting in a high motor angular speed, upon contacting the object the motor angular speed drops to zero. This coincides with an increase in motor current and thus power and heat dissipation. When the motion is fully stopped, the brake can be engaged, and the motor voltage can also be reduced. Subsequently, the motor voltage drops to the minimal voltage required only to provide the bias force. If the gripper detects that the object is slipping from the fingers 25, the voltage goes up and the brake 40 will be disengaged to start over the grasping operation.

Figure 7:
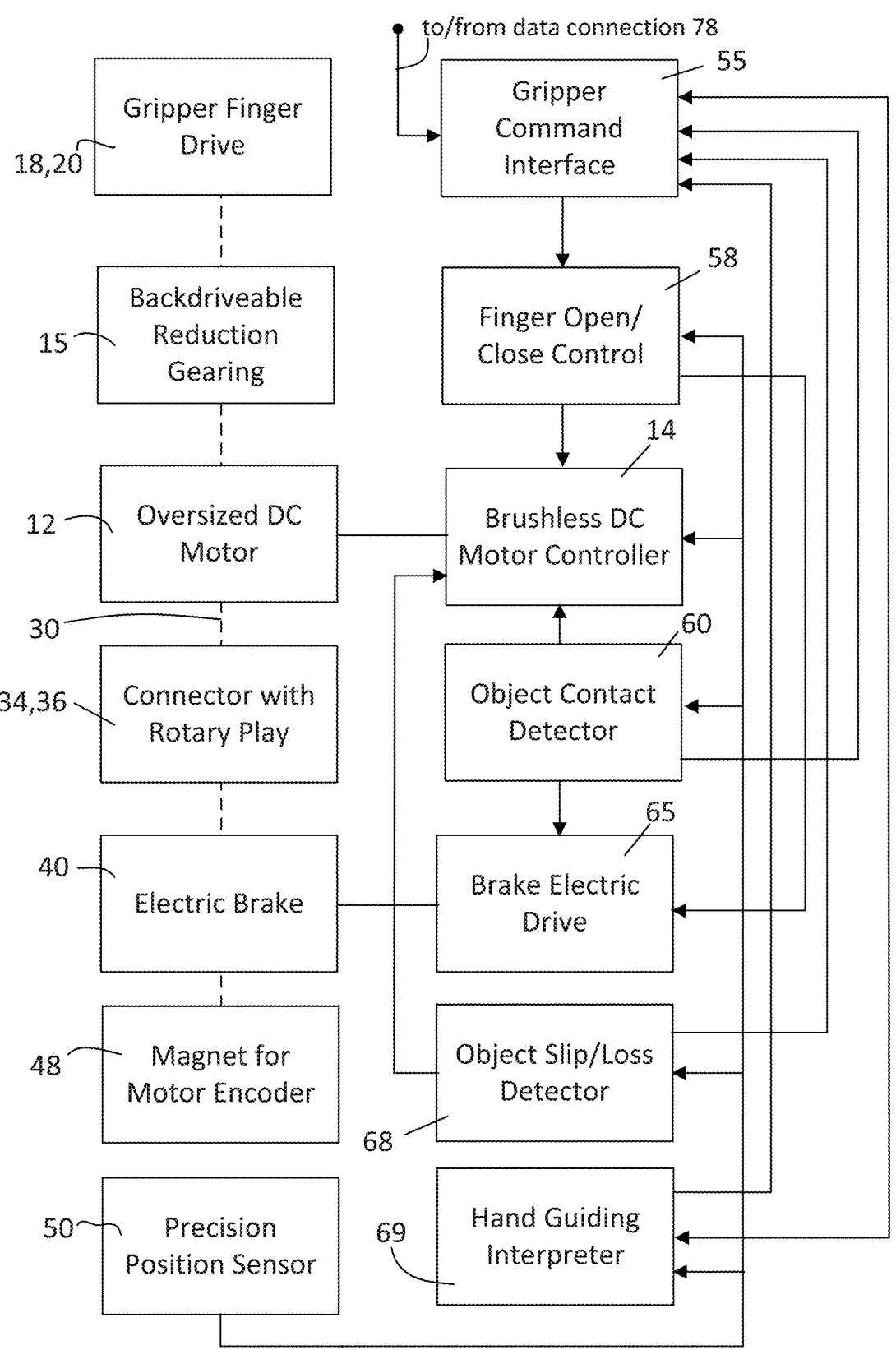
FIG. 7 is a block diagram showing the robotic gripper in accordance with one aspect of the present invention.

FIG. 7 is a block diagram showing different control and mechanical elements of the present invention in accordance with some embodiments. A robot can be connected to a command interface 55 through a data connection 78 to a robot. When the gripper command interface 55 receives a command to grab an object, it commands a finger open/close controller 58 which in turn commands a brushless DC motor controller 14 to close the oversized DC motor 12. Subsequently, the oversized DC motor 12 drives the reduction gear mechanism 15 to close the gripper finger drive mechanism 23 to close the fingers 25.

Figures 11, 12:
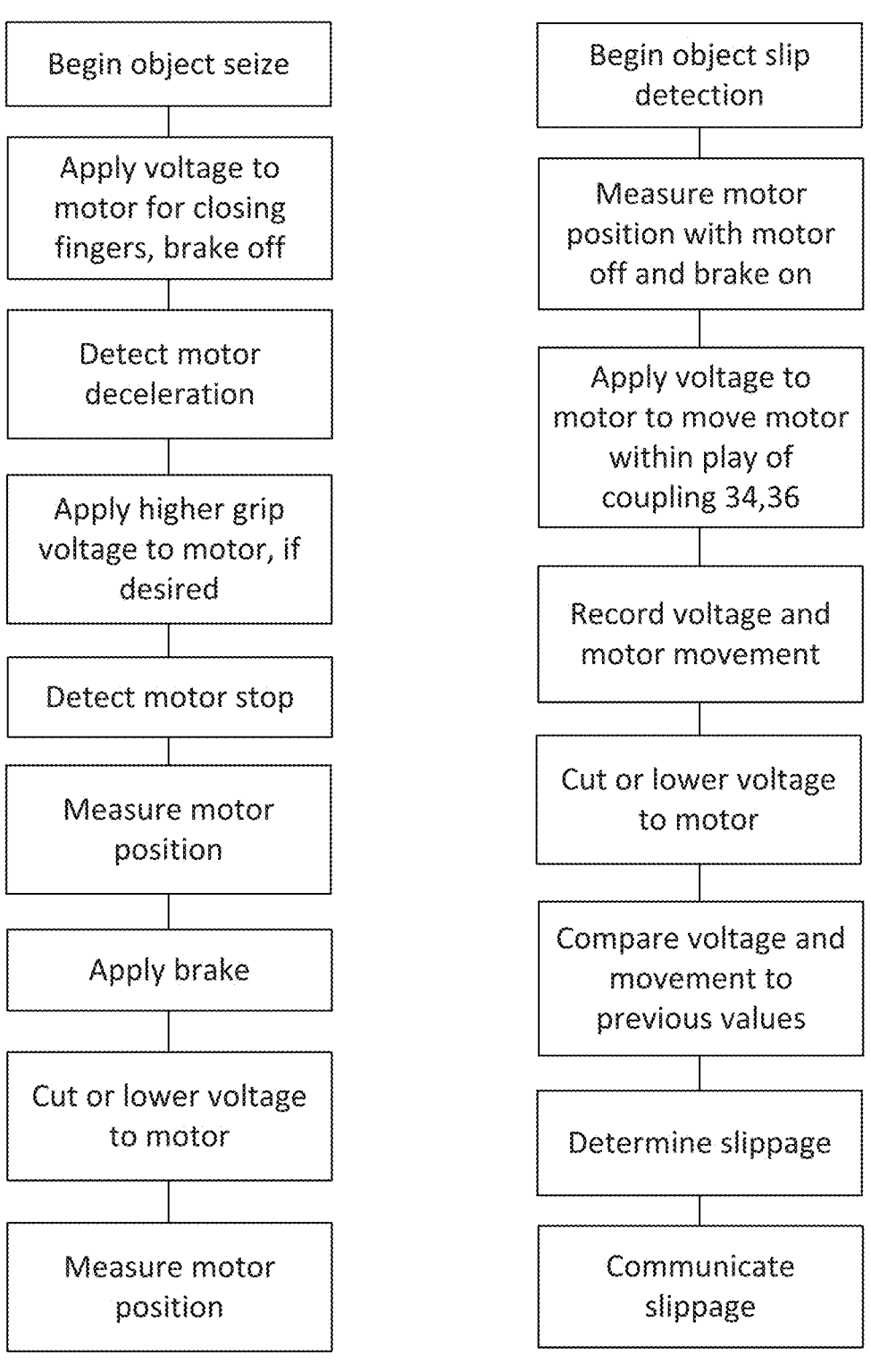
FIG. 11 illustrates a flowchart of the steps a robotic gripper takes to seize an object.
FIG. 12 illustrates a flowchart of the steps a robotic gripper takes to detect an object slipping from the gripper.

When an object contact detector 60 detects the object (from the arresting of the motor position), it applies the brake by signalling brake electric drive 65, reduces the motor voltage by signalling the brushless DC motor controller 14 and sends a signal to the gripper command interface 55. The brake electric drive 65 then engages the electric drive 40 before the brushless DC motor controller 14 stops the oversized DC motor 12. FIG. 11 illustrates a flowchart of the object seizing operation by the robotic gripper in accordance with one embodiment of the present invention. The first step is to apply a voltage to the DC motor 12 to close the fingers 25 while the brake 40 is off and disengaged. Upon detecting the DC motor 12 de-acceleration, it could be desired to apply higher grip force by increasing the DC motor's voltage. When the motor stops, the position of the DC motor position is detected by the precision motor sensor 50, and the brake 40 is applied. After applying the brake 40, as explained herein, the voltage of the DC motor can drop to a minimal voltage just to maintain a bias force. Finally, the motor position is measured again.

A break slip/loss detector 68 observes the object being held and upon detecting a slip or loss using the mechanism explained herein, communicate it to the gripper command interface 55 and brushless motor controller 14 to react accordingly. In an embodiment, the object slip/loss detector 68 can frequently apply a voltage to the DC motor until the shaft portion 34 rotates from the $-\theta$ degree to 0-degree position and register the voltage required for that purpose. Upon detecting a change in the voltage required for rotating the shaft from the $-\theta$ degree to 0-degree position the gripper detects that the object is slipping. Detector 68 can report its observation data to the interface 55 so that a robot control program can decide how to respond to the object slipping information.

FIG. 12 illustrates a flowchart of the object slip detection operation by the robotic gripper in accordance with one embodiment of the present invention. The first step is to measure the DC motor position with the precision motor sensor 50 with the DC motor 12 off and the brake 40 applied. Subsequently, applying a voltage to the DC motor 12 to move the motor and the shaft portion 34 of the play coupling inside the opening 39 and registering the voltage and the motor's movement. Then the DC motor voltage will be reduced or cut off and the voltage and movement recorded is compared to the previous values recorded. Based on the difference between the recorded voltage and the previous values a slippage is determined and communicated with the gripper command interface.

It will be appreciated that the detector 68 can include logic for handling a response to slipping, for example to apply greater holding force. In embodiments using brake control, detector 68 would then control the brake 40 to be able to apply greater holding force.

Figures 13, 14:
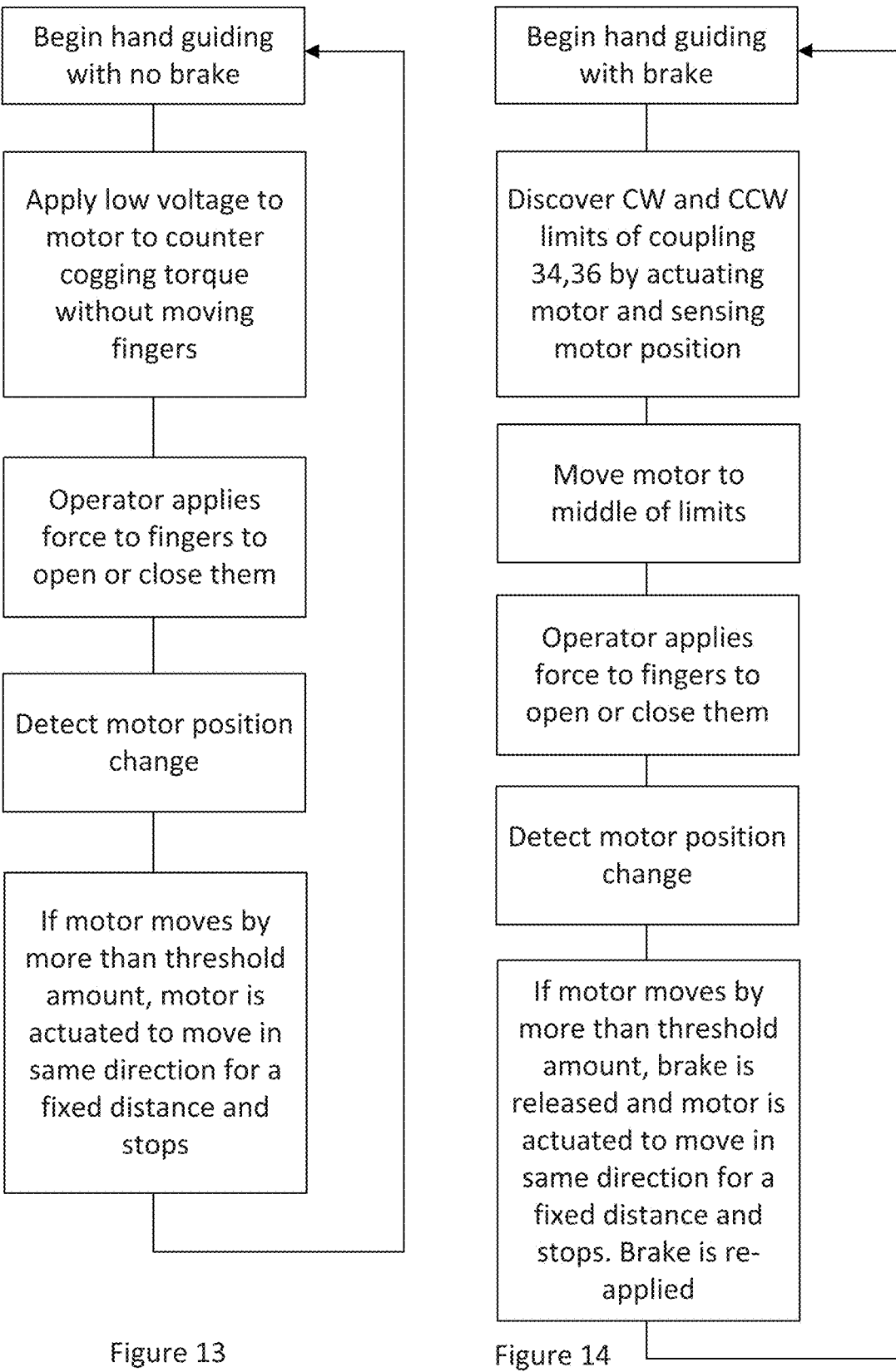
FIG. 13 illustrates a flowchart of the steps taken in hand guiding a robotic gripper with no brake
FIG. 14 illustrates a flowchart of the steps taken in hand guiding a robotic gripper with brake.

A hand guiding interpreter 69 provides interpretation to the gripper command interface 55 based on how the user moves the gripper. FIG. 13 illustrates a flowchart describing steps for hand guiding with no brake in the drive train. The first step is to apply a low voltage to the DC motor to counter cogging torque without moving the fingers 25. Subsequently, a force is applied by an operator to the fingers 25 to open or close them and detecting the motor position change accordingly. If the DC motor moves more than a threshold amount defined by the operator, actuating the motor to move in the same direction for a fixed distance and before stopping and going back to the first step.

FIG. 14 illustrates a flowchart describing the steps for hand guiding with the brake applied. The first step is to discover clockwise and counter clockwise limits of the coupling 34 and 36 by actuating the motor and sensing the motor's position. Subsequently, the motor is moved to a middle of the limits discovered, and the operator applies force to the fingers 25 to open or close them. The position of the motor is detected by the precision position sensor 50. If the DC motor has moved more than a defined threshold, the brake 40 is released and the DC motor 12 is actuated to move in the same direction for a fixed distance definable by the operator before it stops, and the brake is re-applied and it goes back to the first step.

Figure 15:
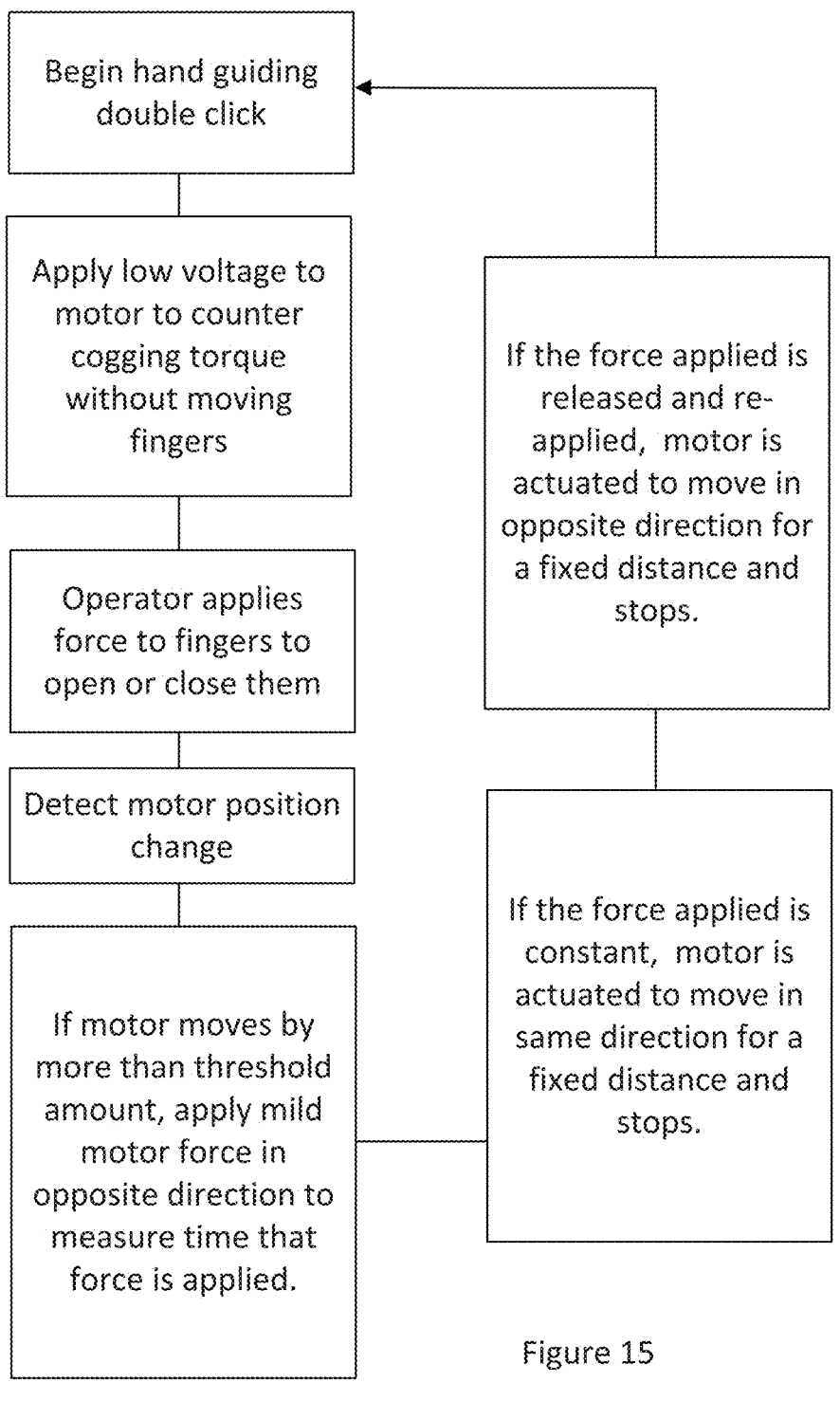
FIG. 15 illustrates a flowchart of the steps taken in hand guiding a robotic gripper using double click.

FIG. 15 illustrates a flowchart of the hand guiding activated by a double click. The first step is to apply a low voltage to the DC motor to counter cogging torque without moving the fingers 25. Subsequently, a force is applied by an operator to the fingers 25 to open or close them and detecting the motor position change accordingly. If the DC motor moves more than a threshold amount defined by the operator, a mild motor force is applied in the opposite direction to measure the time that the force is applied. If the force applied is constant, the motor is actuated to move in the same direction for a fixed distance and stop. If the force applied is release and reapplied, the motor is actuated to move in the opposite direction for a fixed distance and apply.

Teaching a robot to perform a task is known in the art. Typically, an interface such as a pendant interface is used by an operator to control the robot manipulator to move into desired positions, while the system learns the desired movements. Applicant's U.S. Pat. No. 9,696,221 discloses aspects related to teaching a robot to perform tasks in which a force torque sensor is used to allow an operator to apply force to the end effector so that the manipulator follows those forces to learn the movements taught by the operator. However, control over the gripper fingers to teach a grasp is performed using the pendant interface. It will be appreciated that the hand guiding interpreter 69 allows an operator to provide teaching information about gripper finger movements without needing to turn to the pendant. When the force-torque sensor and the hand guiding interpreter 69 are combined, the operator can provide much of the teaching input to the robot teaching system with less need to turn to the pendant interface. This allows the operator to concentrate better on the task being taught.

As shown in FIG. 7, a magnet for motor encoder 48 works with a precision position sensor 50 (e.g. a 12-bit encoder providing 4096 positions) which provides data regarding the position of the motor. In FIG. 7, the output of the encoder 50 is provided to the finger open/close control unit 58, the brushless DC motor controller 14, the object contact detector 60, the brake electric drive 65, the object loss/slip detector 68 and the hand guiding interpreter 69.

In a preferred embodiment the brushless motor controller 14 does not have a physical connection with the oversized DC motor 12 to read the position of the motor and uses only the precision position sensor 50 to locate the position of the shaft 30 and the position of the motor 12 accordingly. Using the precision position sensor 50 would be beneficial as its a 12-bit encoder and provide 4096 positions. Also, it helps to reduce the number of the wires coming out of the motor 12 which would be beneficial for the compact devices. In order to determine the position of the motor using the precision position sensor 50 during an initialization mode, the motor is driven to a specific position by applying power to one of its coils, the reading of this position then will be registered and used as position 0 for precision position sensor 50.

It will be appreciated that the blocks 55, 58, 60, 68 and 69 shown in FIG. 7 can be logic circuits or they can be provided by a processor combined with program code instructions in a memory associated with the processor. While the motor controller 14 can be provided using program code instructions using a processor, the processing speed must be sufficient for proper motor control. The brake drive circuit can be performed by a processor that controls, for example, a pulse-width modulation voltage output control, however, in some embodiments, a dedicated circuit is provided as shown in FIG. 8.

Figure 8:
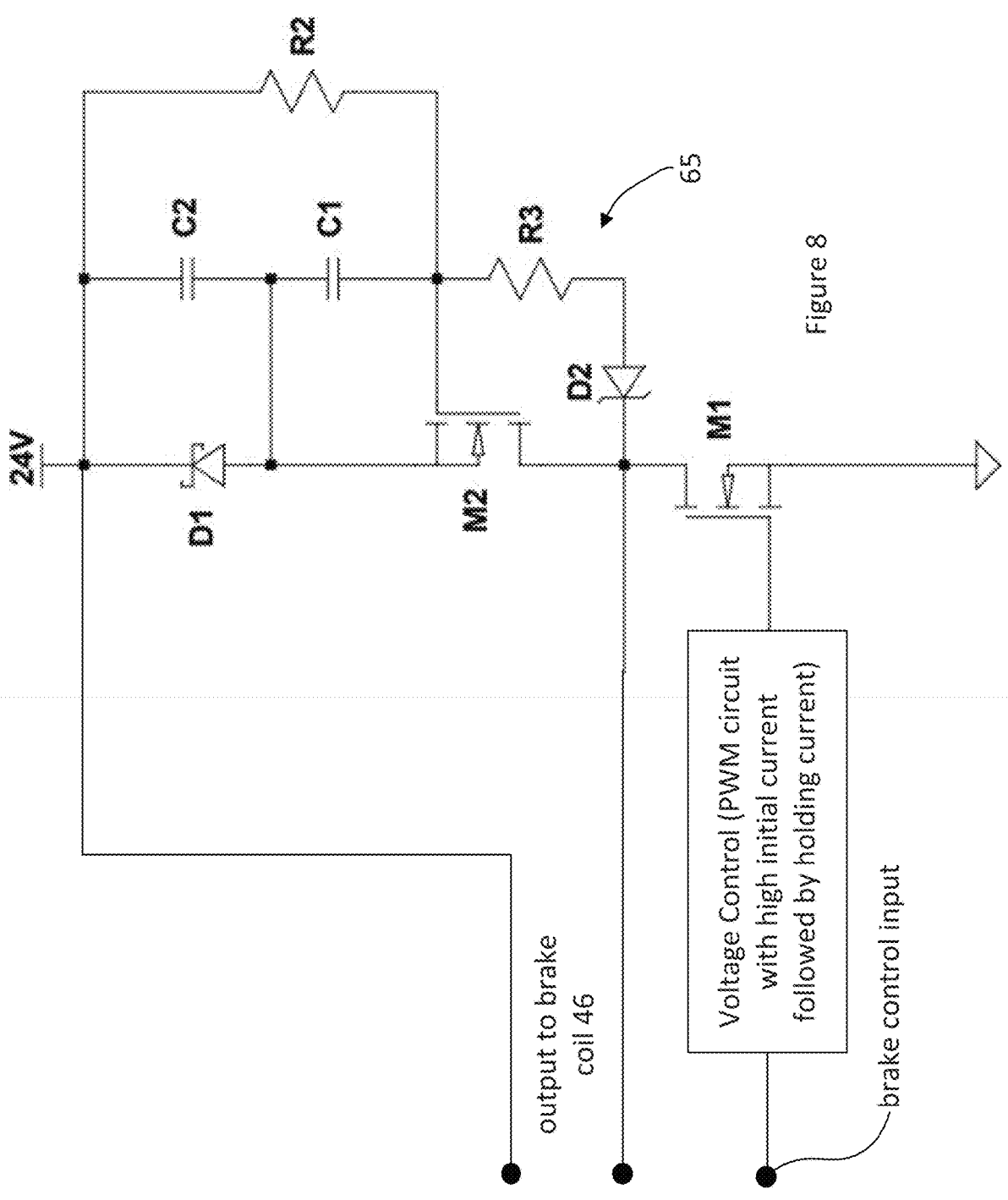
FIG. 8 illustrates a brake drive circuit having a brake control input and a coil signal output variable between at least an ON state and an OFF state in accordance with one aspect of the present invention.

FIG. 8 illustrates a brake drive circuit including a pulse-width modulation (PWM) circuit, having a brake control input and a coil signal output to the bake coil 46. The circuit provides a high initial current followed with a holding current. M1 and M2 may both be n-type metal-oxide-semiconductor-field-effect transistor ("N-MOSFET"). MOFSET has an insulated gate, whose voltage determines the conductivity of the device.

In one embodiment, the coil 46 functions as an inductor, M1 is for the power of the brake and M2 is for energy discharge when the latching delay has passed. C1, R2, R3 are voltage divider and provide delay for switching on the brake once the PWM OFF; D1 is a freewheeling diode in continuous operation, D2 is a Voltage limiting diode for energy discharge, and C2 is the capacitance of maximum inverse voltage limit on diode D1.

To turn a magnetic field of the coil 46 on (to disengage the brake 40), the PMW supplies power to the coil 46 at 100% for an initial period. This results in the pressure plate 44 become attached to the coil 46 and disengaging the brake disc 42. To keep the pressure plate 44 connected to the coil a lower current than 100% can be used, a holding current, is provided by PWM which may be approximately 40% or another determined power value to maintain the pressure plate 44 attached.

The brake 40 needs to be applied by discontinuing the magnetic field. Normally, the coil 46 has a fall or decay time during which the magnetic field reduces gradually due to the coil's inductance. To apply the brake faster, M2 is provided to short-circuit coil 46. This can be done by turning PWM OFF (0%) that results in a voltage surge at coil 46. The voltage surge passes across D2 causing the gate of M2 to turn on. The energy of the coil 46 is then dissipated in the MOSFET M2 and the brake current decreases very rapidly to zero. The pressure plate 44 is then pushed by the springs and comes to tighten the friction disk 42 to engage the brake 40.

Referring to FIG. 9A, illustrate an example of a connector 70 for connecting a robot end effector (not shown here) having a robot data connector 75 to a robot arm end 80, as shown in FIG. 10A. Using its first mounting 71, the connector 70 can be mounted on a mounting 82 to the robotic arm 80.

The connector 70 has a chamber 76 for receiving a signal cable 72 which is connected at one end to an adaptor 77 secured inside the chamber 66 and at the other end to an L-Shaped or 90-degree coupling (robot data connector 75). The shape of the robot data connector 75 provides a better and easier connection with the robot arm end 80. The signal cable can be a ribbon cable or a coaxial cable. The flat cable shown has the advantage of remaining close to the robot manipulator once connected.

In one embodiment, an end effector data connector may comprise the adaptor 77 connected to a first end of the signal cable 72 and having an end effector signal connector 78 (e.g., a surface spring pin connector) on a side of the second mounting 73, for example an eight-pin output connector, which can connect to a robotic end effector. In some embodiments, the connection between the eight-pin output 78 and the robotic end effector forms a seal to protect the connection.

As illustrated in FIG. 9B, the cable 72 pays out from an opening 74 so that a user can adjust the length of the cable 72 according to the need and distance from the robotic arm end. The opening 74 can offer some resistance to the cable 72 or the cable 72 can have a compressible sheathing and frictionally engage the opening 74. The cable 72 can then be pulled out from and pushed back into the chamber 76 as desired. In this way some tension can be kept on the length of cable extending between the opening 74 and the robot data connector 75 at the robot data port 85. This tension can help keep the cable 72 against the side of the manipulator and reduce the chances of catching the cable 72 on an object. Alternatively, the cable 72 contained in the chamber 76 could be biased to retract to provide the tension.

Referring to FIG. 10B, the end effector can be easily mounted on a force torque sensor 84 which itself will be mounted on the robotic arm end 80 by adjusting the length of the cable 72. Force-torque sensors are known in the art, as for example in Applicant's U.S. Pat. No. 9,696,221.

What is claimed is:

1. A connector for connecting a robot end effector to a robot arm having a signal port, the connector comprising:
   a first mounting securable to said robot arm;
   a second mounting securable to said end effector;
   a signal cable having a length with a first end and a second end;
   a chamber for receiving said signal cable, said chamber having an opening for paying out said second end of signal cable;
   an end effector data connector connected to said first end and having an end effector signal connector associated with said second mounting compatible with said end effector; and
   a robot data connector connected to said second end for connecting to said signal port.

2. The connector as claimed in claim 1, wherein said robot data connector is an L-shaped 90-degree connector.

3. The connector as claimed in claim 1, wherein said signal cable is a ribbon cable.

4. The connector as claimed in claim 1, wherein said opening of said chamber frictionally engages said signal cable to provide tension on said signal cable.

5. A robotic system comprising the connector as defined in claim 1, said robotic arm coupled to said connector using said first mounting, and said end effector coupled to said connector using said second mounting.

6. The system as claimed in claim 5, wherein said end effector is a robot gripper comprising:
   a DC motor having a speed of rotation corresponding to an input voltage;
   a reduction gear mechanism having an input connected to said DC motor and an output;
   a gripper finger drive mechanism connected to said output of said reduction gear mechanism;
   at least one finger connected to said gripper finger drive mechanism; and
   a motor drive controller configured to provide a first fixed drive voltage to said DC motor to rotate at a first rotational speed causing said at least one finger to move at a second linear speed in a direction to pinch an object, said first fixed drive voltage causing said DC motor to apply a constant first torque to said input of said reduction gear mechanism when arrested, said constant first torque causing said at least one finger to apply a constant holding force to said object;
   wherein, due to rotational inertia of said DC motor and said reduction gear mechanism, when said at least one finger decelerates from said second linear speed to zero as said at least one finger pinches said object when said object is rigid said at least one finger will apply a peak pinch force to said object that is no more than 60% greater than said constant holding force.

7. The system as claimed in claim 6, wherein a pinch force of said at least one finger, generated when said at least one finger is arrested by contacting a rigid object and causing said DC motor to decelerate from a speed close to said nominal maximum down to zero, is less than 10% greater than a holding force of said at least one finger due to said motor exerting said nominal maximum torque.

8. The system as claimed in claim 6, wherein said robot gripper further comprises:
   an encoder reading a position of one of said motor and said gripper drive mechanism;
   an electrically controllable brake;
   a play coupling connected between said DC motor and said brake, wherein said play coupling allows said DC motor to rotate within limits when said brake is applied; and
   an object slip or loss detector connected to said encoder and configured to signal when said DC motor rotates within said limits when said brake is applied due to object slip or loss under conditions of a bias applied to said DC motor.

9. The system as claimed in claim 8, wherein said object slip or loss detector comprises a processor associated with program memory storing processor instructions which when executed perform:
   measuring a position of said motor with said motor off and said brake applied;
   applying a low voltage to said motor, said low voltage exerting enough force to move said motor within said limits when no object is seized by said at least one finger and not enough force to move said motor within said limits when an object is seized by said at least one finger; and
   determining from said position from said encoder whether an object is seized by said gripper.

10. The system as claimed in claim 8, wherein said object slip or loss detector comprises a processor associated with program memory storing processor instructions which when executed perform:
   measuring a position of said motor with said motor off and said brake applied;
   applying a variable voltage to said motor, said variable voltage exerting enough force to move said motor within said limits when an object is seized by said at least one finger;
   measuring a position of said motor;
   recording said variable voltage at which said motor moves within said limits;
   repeating said applying and said recording;
   determining from said variable voltage at which said motor moves within said limits to determine a change in said gripping force exerted on said object seized by said gripper, said change being indicative of said object slip.

11. The system as claimed in claim 10, wherein said processor instructions further perform reducing a voltage applied to said motor for a period of time after said recording before re-applying said variable voltage.

12. The system as claimed in claim 5, wherein said end effector is a robot gripper comprising:
   a DC motor;
   a backdrivable reduction gear mechanism having an input connected to said DC motor and an output;

a gripper finger drive mechanism connected to said output of said reduction gear mechanism;

at least one finger connected to said gripper finger drive mechanism;

a motor drive controller configured to provide a voltage to said DC motor;

an encoder reading a position of one of said motor and said gripper drive mechanism;

an electrically controllable brake;

a play coupling connected between said DC motor and said brake, wherein said play coupling allows said DC motor to rotate within limits when said brake is applied; and an object slip or loss detector connected to said encoder and configured to signal when said DC motor rotates within said limits when said brake is applied due to object slip or loss under conditions of a bias applied to said DC motor.

13. The system as claimed in claim 12, wherein said object slip or loss detector comprises a processor associated with program memory storing processor instructions which when executed perform:

measuring a position of said motor with said motor off and said brake applied;

applying a low voltage to said motor, said low voltage exerting enough force to move said motor within said limits when no object is seized by said at least one finger and not enough force to move said motor within said limits when an object is seized by said at least one finger; and determining from said position from said encoder whether an object is seized by said gripper.

14. The robot gripper as claimed in claim 12, wherein said object slip or loss detector comprises a processor associated with program memory storing processor instructions which when executed perform:

measuring a position of said motor with said motor off and said brake applied;

applying a variable voltage to said motor, said variable voltage exerting enough force to move said motor within said limits when an object is seized by said at least one finger;

measuring a position of said motor;

recording said variable voltage at which said motor moves within said limits;

repeating said applying and said recording;

determining from said variable voltage at which said motor moves within said limits to determine a change in said gripping force exerted on said object seized by said gripper, said change being indicative of said object slip.

15. The robot gripper as claimed in claim 12, wherein said DC motor has a speed of rotation corresponding to input voltage, and wherein said motor drive is provides a first fixed drive voltage to said DC motor to rotate at a first rotational speed causing said at least one finger to move at a second linear speed in a direction to pinch an object, said first fixed drive voltage causing said DC motor to apply a constant first torque to said input of said reduction gear mechanism when arrested, said constant first torque causing said at least one finger to apply a constant holding force to said object.

16. The robot gripper as claimed in claim 15, wherein said DC motor has a speed of rotation corresponding to input voltage, and wherein said motor drive provides a first fixed drive voltage to said DC motor to rotate at a first rotational speed causing said at least one finger to move at a second linear speed in a direction to perform a pinch grasp, and said first fixed drive voltage causing, in use, said DC motor to apply a constant first torque to said input of said reduction gear mechanism when arrested, said constant first torque causing said at least one finger to apply a constant holding force; wherein, in use with said DC motor driven at said first fixed drive voltage, said at least one finger applies a peak pinch force to a rigid object when making initial contact with said rigid object, said peak pinch force not exceeding 1.6 times said constant holding force.

17. The system as claimed in claim 5, wherein said end effector is a robot gripper comprising:

a DC motor;

a reduction gear mechanism having an input connected to said DC motor and an output;

a gripper finger drive mechanism connected to said output of said reduction gear mechanism;

at least one finger connected to said gripper finger drive mechanism; and a motor drive controller configured to provide a voltage to said DC motor;

an encoder reading a position of one of said motor and said gripper drive mechanism; and a hand guiding action interpreter connected to said encoder, said hand guiding action interpreter configured to respond to said position read by said due to operator action on said at least one finger and to interpret said motion to output a signal representing at least one operator command.

* * * * *